Feb. 15, 1966 T. W. WINSTEAD 3,235,638
METHOD FOR FORMING PLASTIC CONTAINERS
Filed Sept. 7, 1961 5 Sheets-Sheet 2
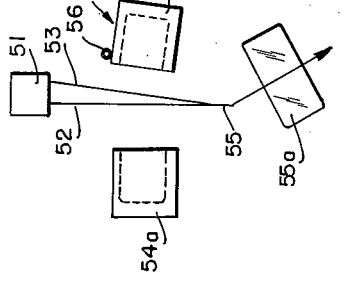
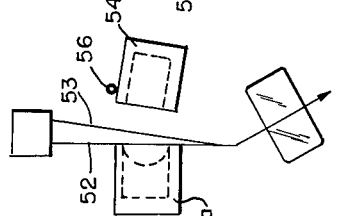
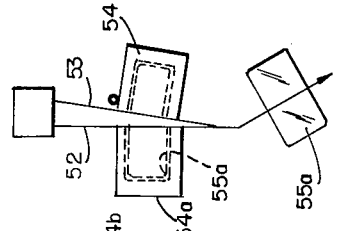
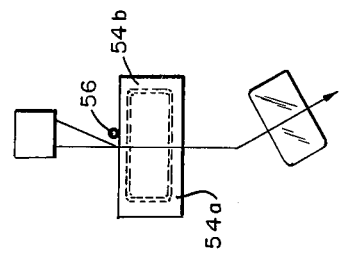
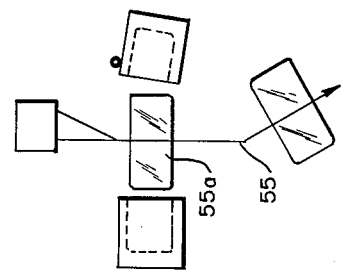
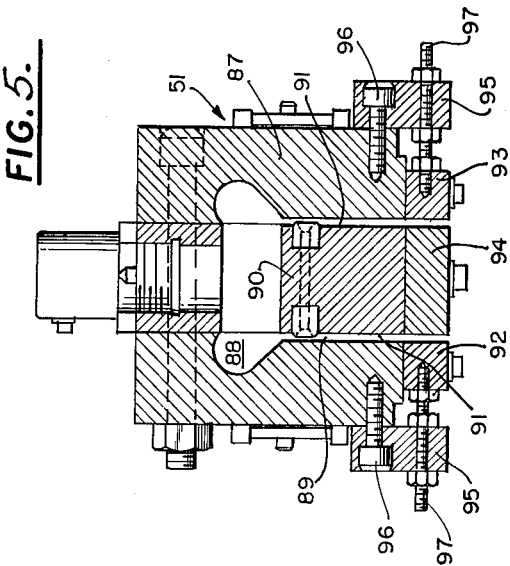
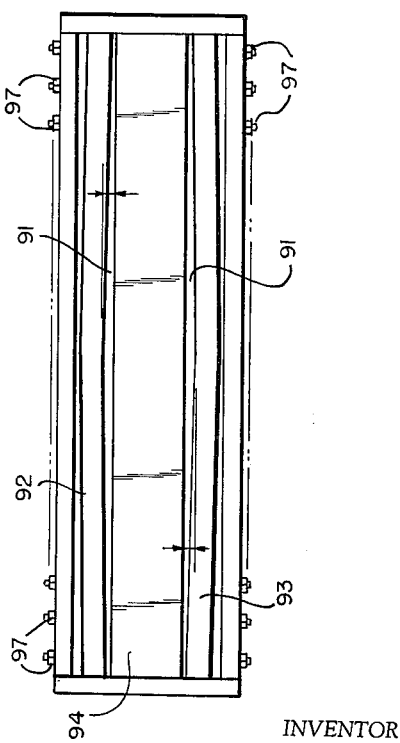
INVENTOR
Thomas W. Winstead
BY Raphael Semmes
ATTORNEY

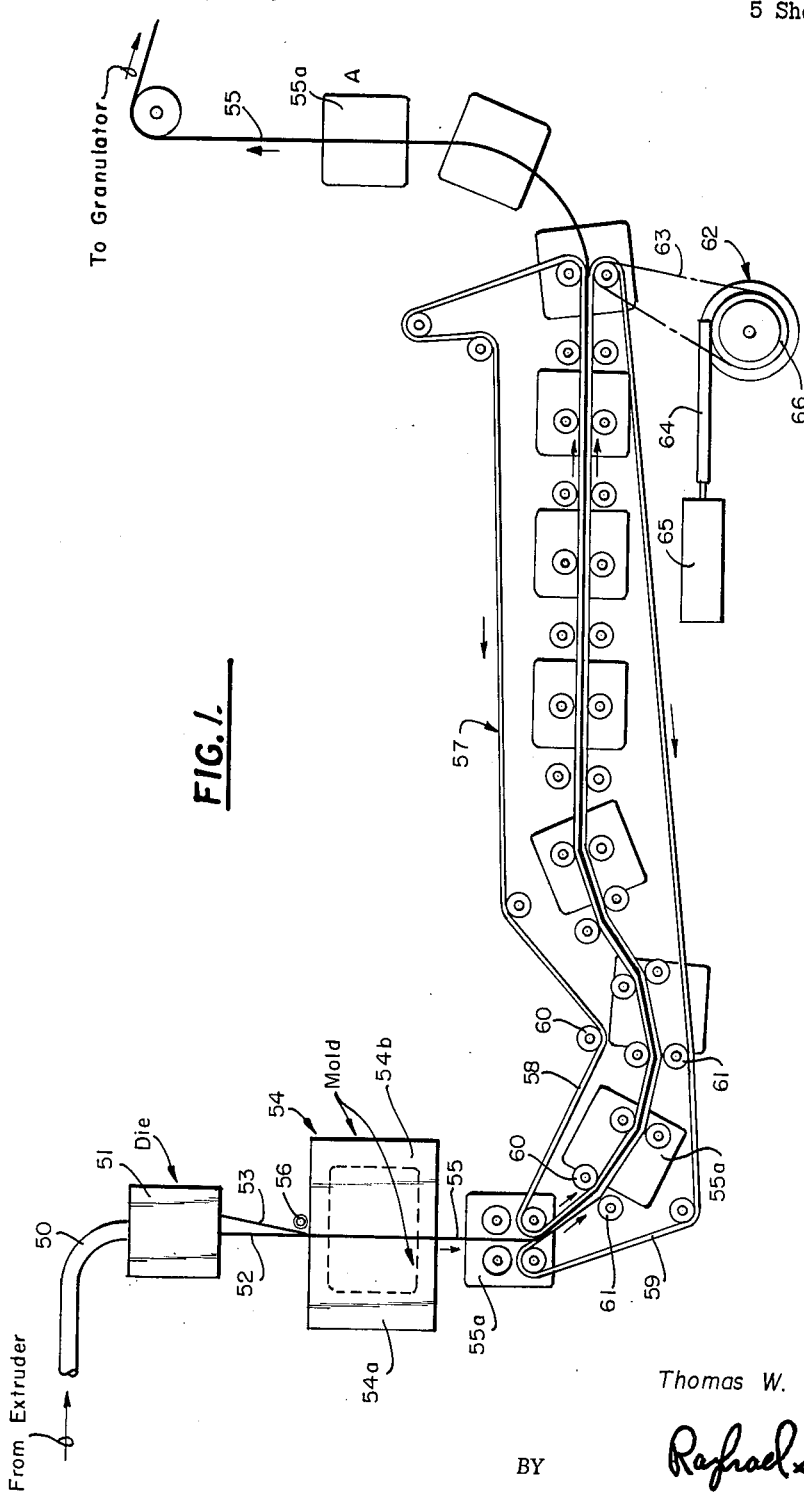

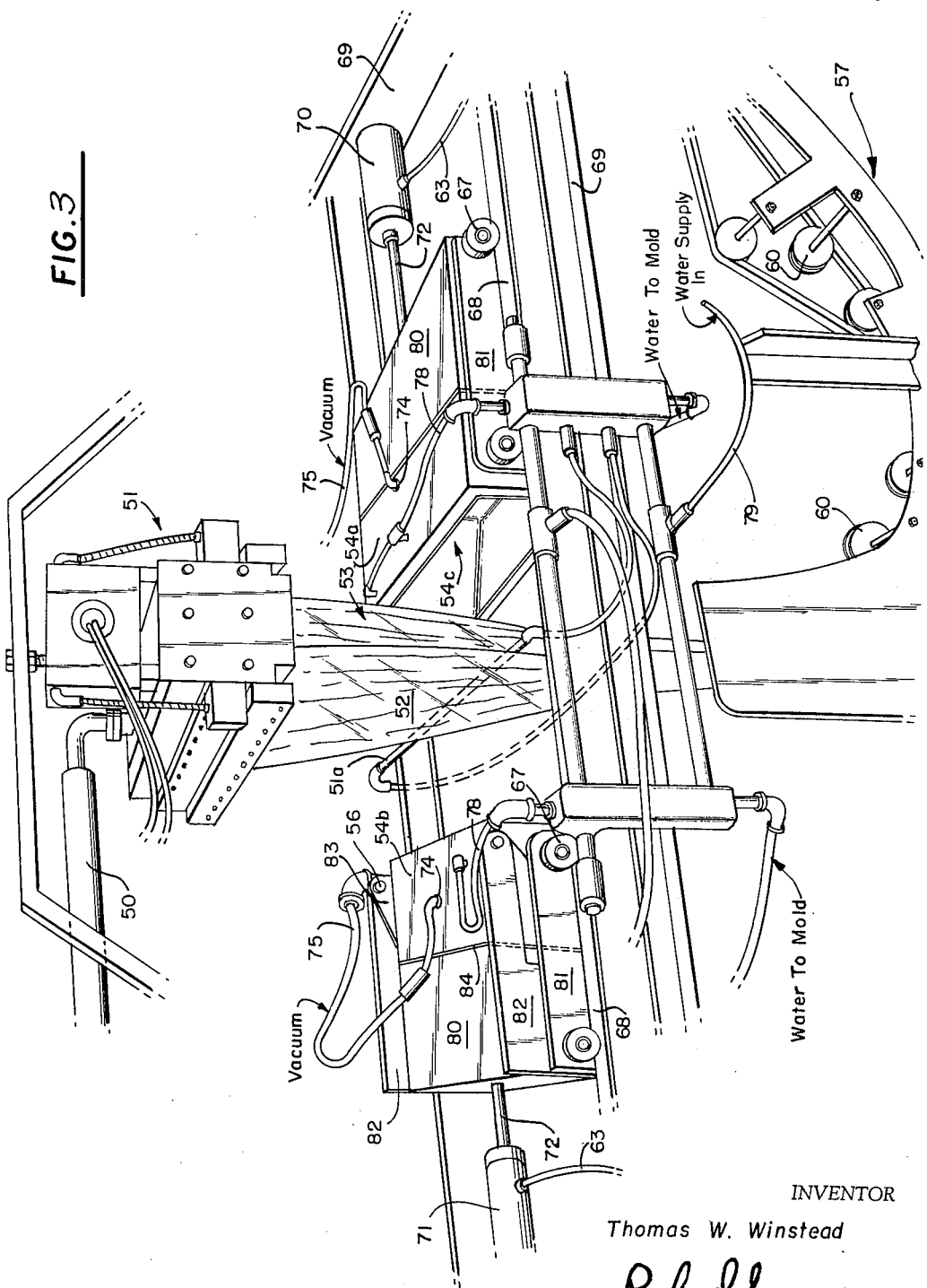

Feb. 15, 1966  T. W. WINSTEAD  3,235,638
METHOD FOR FORMING PLASTIC CONTAINERS
Filed Sept. 7, 1961  5 Sheets-Sheet 4
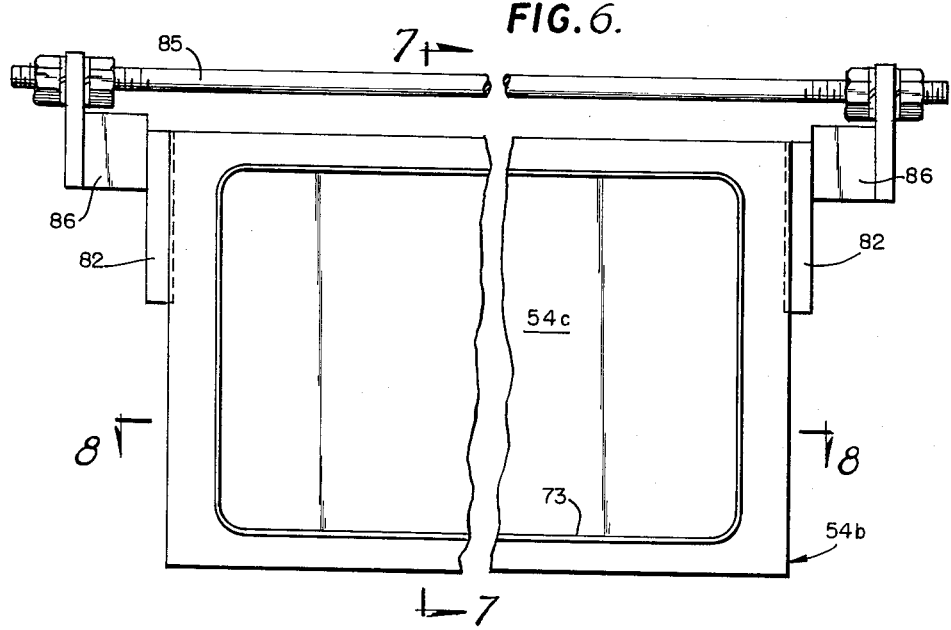
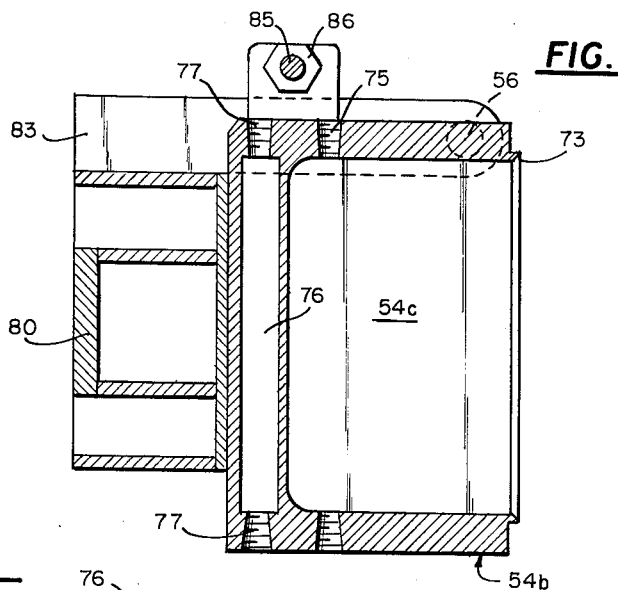
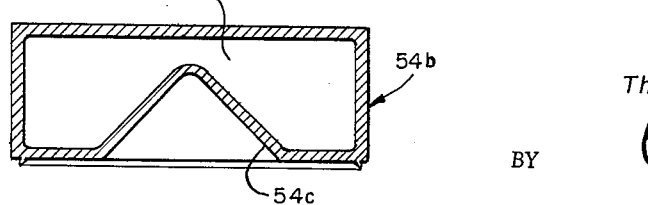
INVENTOR
Thomas W. Winstead
BY Raphael Semmes
ATTORNEY Feb. 15, 1966 T. W. WINSTEAD 3,235,638
METHOD FOR FORMING PLASTIC CONTAINERS
Filed Sept. 7, 1961 5 Sheets-Sheet 5
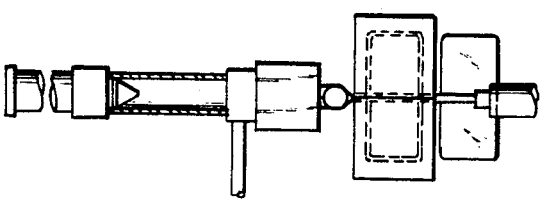
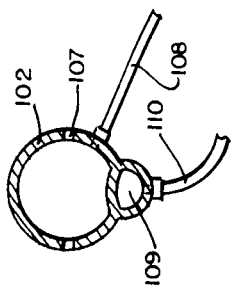
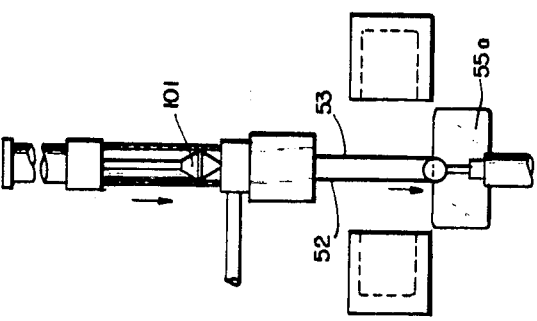
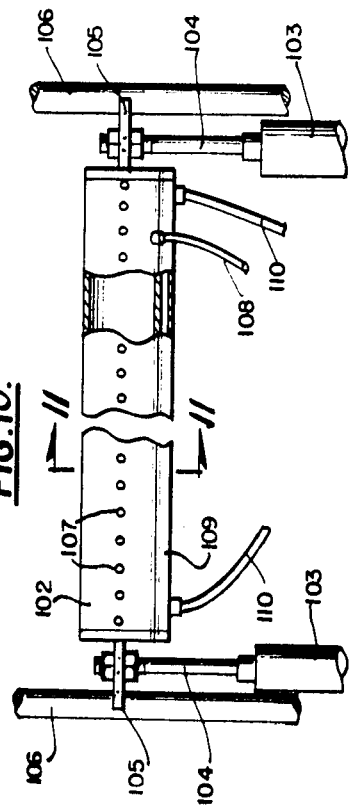
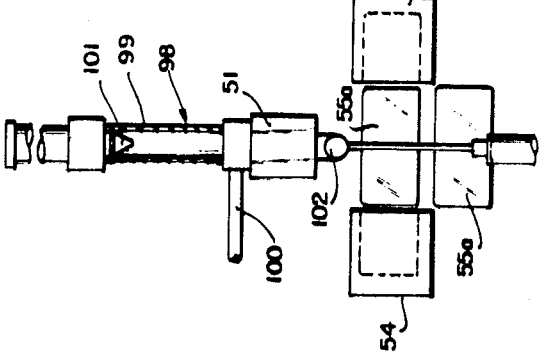
INVENTOR
Thomas W. Winstead
BY
*Raphael Semmes*
ATTORNEY

United States Patent Office 3,235,638
Patented Feb. 15, 1966

3,235,638
METHOD FOR FORMING PLASTIC CONTAINERS
Thomas W. Winstead, Baltimore, Md., assignor to Hedwin Corporation, New York, N.Y., a corporation of Maryland
Filed Sept. 7, 1961, Ser. No. 136,993
5 Claims. (Cl. 264—90)

The present invention relates broadly to a process for manufacturing containers, the present application being a continuation-in-part of copending application Serial No. 528,772 filed August 16, 1955.

More specifically, the invention consists in new and useful improvements in a process for manufacturing containers of plastic material in either a continuous or semi-continuous vacuum forming operation, using two mold halves which close against each other to seal the halves. The method of the present invention depends both for forming and sealing on the heat capacity of plastic sheeting resulting from its extrusion.

Heretofore, plastic containers in the nature of bottles or other diverse forms have been manufactured by different methods and processes. None of these, however, have been entirely satisfactory or sufficiently economical. It has also not been possible heretofore to make completely enclosed containers of plastic material, and problems have arisen in previous known methods of controlling thickness distribution in the finished containers.

Accordingly, it is an object of the present invention to provide a continuous or semi-continuous method for manufacturing plastic containers of diverse shapes, in an inexpensive and rapid manner, and which is primarily adapted for manufacturing polyethylene containers of varying shapes.

Another object of the present invention is to provide a continuous or semi-continuous method for manufacturing plastic containers which is inherently less expensive than either blown or injection molded plastic containers, because of the fact that material distribution is more efficient and the thickness of the material can be controlled to meet practically any requirement. Additionally, the operation and method to be described hereinafter is completely automatic.

According to the present invention, polyethylene or other plastic material utilized is extruded from an extrusion die in two hot sheets which are simultaneously vacuum formed into the desired shape while still hot, and before the inner surfaces thereof have dropped in temperature. A seal or weld is effected by forcing two molds together causing contact of the hot material around the periphery of each mold cavity.

Another object of the present invention is to provide a method for continuous or semi-continuous manufacture of completely enclosed containers without ports or openings of any kind of plastic material, which are useful where openings are undesirable, or in food or pharmaceutical containers where sanitation or sterilization is important.

Another object of the present invention is to provide a method wherein the thickness of extruded sheets of plastic material utilized for manufacturing the containers can be varied in cross-section by initial adjustments in the die, which adds additional thickness to compensate for stretching into the deepest portions of molds and to thicken the containers at corners or other critical areas when desired.

A still further object of the present invention is to provide a method giving greater versatility of optimum thickness distribution of material than is possible in any process currently being used.

An additional object of the present method is to provide a continuous or semi-continuous vacuum forming operation using two mold halves which close against each other to seal half containers and depending for both forming and sealing on the heat capacity of the sheeting resulting from its extrusion. Due to this, a high rate of production can be attained and excellent control over thickness distribution is provided, thereby minimizing costs in a finished product while increasing rates, and cooling times are minimized because of the lack of unnecessarily thick sections which inherently delay the cooling cycle.

A further object of the invention particularly adaptable for the manufacture of plastic containers of quart, gallon and five-gallon capacities for example, is to provide a method wherein two sheets of plastic material are extruded from a dual die, vertically downward for vacuum forming engagement with two opposed mold halves arranged for horizontal movement into and out of engagement in a fixed horizontal plane to intermittently form and join container halves, wherein the formed containers are partially cut from but remain in engagement with the selvage to facilitate their conveyance to a convenient point of manual removal.

Another object of the invention in this embodiment is to provide means to insure parallel engagement of both mold halves with their respective sheets of plastic material immediately prior to vacuum molding and to compensate for the converging angles of the unformed areas of said sheets after advanced portions thereof have been joined by the preceding forming step.

In accordance with the invention, a plurality of mold halves work in sequence on the two sheets of extruded polyethylene plastic. The first step is the vacuum forming of the two halves of the container; the second step is the sealing of the two thus formed halves by pressing opposed mold halves together and which pressure is maintained until the containers have chilled sufficiently to prevent distortion; the thus formed containers are released by retraction of the mold halves. The finished containers remain in a continuous sheeting and are thereafter torn or ruptured from the continuous strip, which thereafter is granulated for re-use in order to eliminate waste.

The molds of the present invention can be cooled if desired to facilitate and speed up the operation.

Other and further objects and advantages of the invention will be apparent from the following detailed description of various forms of apparatus for practicing the present invention, taken together with the accompanying drawings in which:

FIGURE 1 is a diagrammatic view illustrating one form of apparatus for practicing the invention in a continuous operation with vertically stationary, horizontally movable mold halves;

FIGURES 2A to 2E diagrammatically illustrate the sequential steps of the method and apparatus illustrated in FIGURE 1;

FIGURE 3 is a fragmentary perspective view of apparatus for practicing the invention in accordance with the embodiment shown in FIGURE 1;

FIGURE 4 is a diagrammatic illustration of the extrusion die adjustment for effecting thickness distribution in the extruded sheets;

FIGURE 5 is a transverse sectional view of the extrusion die;

FIGURE 6 is a broken plan view of the open face of one mold half;

FIGURE 7 is a sectional view taken on line 7—7 of FIGURE 6;

FIGURE 8 is a further sectional view taken on line 8—8 of FIGURE 6;

FIGURES 9A to 9D are diagrammatic illustrations of the sequential steps in practicing a further modified form of the invention wherein the process is semi-continuous;

FIGURE 10 is an enlarged elevational view, partly in section, illustrating the sheet pull down bar employed in the process illustrated in FIGURES 9A to 9D; and FIGURE 11 is a transverse sectional view taken on line 11—11 of FIGURE 10.

The process of the present invention is diagrammatically illustrated in FIG. 1 which shows the general organization of one form of apparatus which may be employed. Molten plastic material from an extruder (not shown) is conducted through conduit 50 to a dual die 51, hereinafter described more in detail, which simultaneously extrudes two separate sheets of plastic 52 and 53. It will be understood that the die openings are parallel and transversely spaced so that the extruded sheets are fed to the mold mechanism in opposed, spaced relation.

The mold mechanism generally represented by the numeral 54 comprises two vacuum mold halves 54a and 54b, respectively arranged for reciprocation in a fixed horiontal plane, into and out of molding engagement with respective sheets 52 and 53. As hereinafter described more in detail, the mold 54 is designed for vacuum forming and in order to facilitate the continuous operation of the process, is located a sufficient distance below the die 51 to provide a space between the die and the molds, when the latter are closed, in which the continuously extruded sheeting can be gathered, hanging in mid-air only under the influence of gravity. In other words, in the present embodiment of the invention, the molds do not rotate or move vertically during the forming operation, and although the sheet material is being continuously extruded, in actual practice this sheeting, which is under some tension at the time the mold halves close, tends to contract or absorb more volume by growth in width and thickness, and during this time interval, when the molds are closed, the space between the top of the molds and the die can accommodate the material extruded in this phase of the cycle, so that it does not pile up in a heap on the top of the molds.

The principal steps of the forming cycle of the process will best be understood by reference to FIGS. 2A to 2E inclusive. FIG. 2A shows the position of parts in that period of the continuous operation just after the web or selvage 55 composed of the joined sheets 52 and 53 and a formed container 55a, have been pulled down from the forming area 54 to present new material for sequential forming by the molds. Here it will be seen that by joining the sheets 52 and 53 as at 55, the unformed portions of said sheets converge after leaving the parallel spaced dies.

Preferably, the sheet 52 is extruded in a substantially vertical direction while the sheet 53, after being joined in the selvage, is angularly disposed with respect to sheet 52 in the area between the open mold halves and the die. Therefore, while the horizontally movable mold half 54a is arranged with its face always parallel to the vertical sheet 52, the opposite mold half 54b is pivotally mounted at one end, as at 56, so that when disengaged from the mold half 54a, the face of the pivoted mold half 54b swings to a position wherein its face is parallel to the angularly disposed sheet 53. By this arrangement, the sheet engaging faces of both mold halves are presented to their respective plastic sheets in parallel relation so that when the mold halves engage the sheets, the air is simultaneously sealed off from the cavity in the molds to enable the proper vacuum forming operation to be accomplished.

As will later be described more in detail, suitable apparatus is provided for causing the respective mold halves to move horizontally into engagement with the respective sheets 52 and 53, the arrangement being such that the mold half 54a moves inwardly slightly in advance of the corresponding movement of the opposite mold half 54b and contacts the sheet 52, initiating the forming of that sheet, as shown in dotted lines in FIG. 2B. After a momentary pause, the pivoted mold half 54b is moved inwardly into engagement with its sheet 53, and by means of the vacuum created in the mold halves, the individual container halves are pre-formed, as shown in dotted lines in FIG. 2C. Alternatively, the molds can contact the sheets simultaneously.

At this point, the container halves are completely formed but not joined and, as shown in FIG. 2b, final inward movement of the pivoted mold half 54b brings the mold halves together, swinging the mold half 54b on its pivot 56, so that the open faces of the molds are parallel to effect a seal between the two formed halves of the container. It will be understood that between the cycle periods illustrated in FIGS. 2C to 2D, air is permitted to enter between the two sheets at the top and ends where space still remains unobstructed, and as soon as the parts are fully formed, the molds close together to effect the seal of the two halves, and during this period, material for the next cycle is accumulating between the molds and the die, as before stated.

Upon completion of the forming and sealing operations, the mold halves are withdrawn from contact, leaving the formed container 55a attached to the selvage 55, as shown in FIG. 2E. During the course of the sequential steps just described, the formed portions of the sheets are cooled by means of the introduction of water in cooling jackets provided in the mold halves, as will be explained more in detail with reference to one form of apparatus for practicing this process. As will also be explained, the open faces of the mold halves are provided with knife edges designed to only partially cut through the thickness of the sheets at the time of forming, a cut of approximately 90% of the thickness of the sheet, so that the formed containers remain in the selvage 55 and are drawn away thereby on a suitable take-off mechanism, to a point where the operator inspects and removes the containers from the selvage.

Returning to FIG. 1, the take-off mechanism generally indicated by the numeral 57, comprises two coacting endless belts or chains 58 and 59, respectively adapted to pass over a series of rollers 60 and 61 and arranged in sets adjacent opposite longitudinal edges of the selvage 55. Each set of belts or chains 58–59 is so arranged that adjacent parallel runs thereof pass between pairs of opposed rollers 60–61 in gripping or pinching engagement with respective edges of the selvage 55. The belts are power driven by any suitable means, such as the device shown at 62, connected to the rollers by a drive chain 63 so that the respective endless belts conduct the selvage 55 carrying the formed containers 55a to a suitable point A, for manual removal of the containers, from whence the remaining selvage is conducted to a granulator (not shown) for re-use.

To accommodate the momentary halting of the plastic sheets 52 and 53 and the selvage 55 during the actual forming step, it is desirable to provide for the intermittent operation of the drive device 62, so as to drive the belt or chain intermittently through a stroke equal to the amount of vertical pull down of the extruded dual sheets. This take off drive 62 may include a rack 64 driven by the piston of a cylinder 65 and operating a drive pinion 66, in conjunction with any suitable one-way clutch. Obviously, the operation of this rack and piston will be coordinated by any suitable means with the mold forming step.

While belts can be used in this take off mechanism, it has been found that chains are preferable as they do not stretch and can be cycled faster with less wear.

Referring more specifically to one embodiment of an apparatus for practicing this invention, attention is directed to FIG. 3, and for clarification, it may be noted that FIG. 3 is a perspective view looking at the opposite side of the apparatus from that diagrammatically illustrated in FIG. 1. In other words, the hinged mold half 54b is shown on the left side of the dual sheets in FIG. 3, while the reverse is true in FIG. 1.

The vacuum mold halves 54a and 54b are mounted for horizontal reciprocation by means of suitable rollers 67 running on guide rails 68 supported on a frame 69. The rollers 67 are mounted on opposite sides of respective mold halves and the guide rails 68 are positioned to insure accurate alignment of the two mold halves when they meet. Hydraulic cylinders 70 and 71, supported by the frame 69, are operatively connected to the outer ends of the respective mold halves 54a and 54b, by means of plunger rods 72, and any suitable control means (not shown) interposed in the hydraulic line 63, may be employed for properly timing the operation and progressive closing of the mold halves with respect to one another, as well as the timing of the operation of the rack 64 in the take off mechanism 57.

The structure of the molds per se, will best be understood by referring to FIGS. 6 and 7 in conjunction with FIG. 3. Each of the mold halves is provided with a mold cavity 54c of a contour to form one half of the ultimate container. Each of these cavities is bounded by a forwardly projecting knife edge 73 which, as before stated, is designed to only partially cut through the thickness of the extruded sheets during the forming cycle, so as to leave the formed containers supported by the selvage.

Each of the cavities 54c is connected at 74 to a vacuum line 75 leading from a source not shown, the operation of said vacuum being controlled and coordinated by any conventional control mechanism. The molds are designed with water cavities 76, best seen in FIG. 8, extending over their entire back surfaces for fast cooling, water being circulated through openings 77 by means of suitable hose connections 78 fed from a water supply line 79.

In the embodiment shown in FIG. 3, the rear face of each mold half is backed up by a platen 80 which serves as the supporting member for respective molds, as well as the structural member through which the force from the hydraulic cylinders 70 and 71 is applied. The platens 80 are supported on parallel side plates 81 which, in turn, carry the rollers 67 for engagement with the guide rails 68.

The pivoted mold half 54b in the embodiment illustrated in FIG. 3 is intended for use in the manufacture of containers of smaller capacity, such as quarts, gallons and five-gallons, and here it will be seen that the pivots 56 are supported in side frames 82 and extend through mounting plates 83 fixed to opposite sides of mold half 54b adjacent its forward edge. The rear face of this mold half is disconnected from both the platen 80 and the side frames 82, and the location of the pivots 56 is such as to permit the mold half to swing slightly downwardly about the pivots when its forward face is disengaged from the opposite mold half 54a, so as to present the open face of mold half 54b to the angularly disposed plastic sheet 52 in parallel relation thereto. A transverse slot or clearance space 84 may be provided between the mold half and platen at the adjacent edges of their upper surfaces to accommodate the swinging movement of the mold half. In this connection, it may be stated that the pivotal movement is relatively slight, and the mold half is stopped at a point where the bottom edge thereof is approximately a quarter of an inch from the opposite mold half and its top edge is approximately an inch and a half from the other mold half.

The particular embodiment of mold half shown in FIGS. 6 and 7 is intended for use in the manufacture of larger containers, such as fifteen gallon containers, and embodies a trunnion connecting bar 85 connected between brackets 86 secured to opposite side frames 82 to insure that the pivots 86 remain parallel. Otherwise, its operation is the same as that described in connection with FIG. 3.

In order to maintain the extruded sheets 52 and 53 out of contact with one another between the die and the actual forming step, a water cooled rod 51a is preferably provided between the sheets and above the mold halves. This rod is connected in any convenient manner to the water system 79 and suitably supported on the main frame 69 by means not shown. It may be stated that if the sheets are not separated, atmospheric air cannot enter the molds when the halves are formed, and the ultimate container would not retain its shape after the molds were opened, since a partial vacuum would exist inside the container. The rod 51a must be cooled to keep the hot sheets from sticking to it during the draw down operation.

As previously explained, thickness distribution in the extruded sheets is an important feature of this invention and although other specific die means may be employed for accomplishing this function, that shown in FIGS. 4 and 5 will illustrate a construction which has proven satisfactory. Here it will be seen that the die comprises a main housing 87, having a plastic receiving chamber 88 arranged to discharge downwardly through a throat 89. A longitudinally extending separator bar 90 is centrally disposed in the throat 89 and spaced from opposite sides thereof to form two longitudinally extending parallel passageways 91. The bottom face of the die housing 87 is provided with two adjustable outer die lips 92 and 93, and a common central die lip member 94, the adjustable die lips 92 and 93, as best seen in FIG. 4, comprising elongated bars of resilient metal spaced on opposite sides of the central lip member 94 to provide continuations of the passageways 91.

The adjustable lips 92 and 93 are connected to side frames 95 which are bolted as at 96, along opposite lower edges of the housing 87. The frames 95 are spaced outwardly from the lips 92 and 93, and by means of a series of spaced adjusting nuts and bolts 97, any intermediate area of the adjustable lips may be flexed either toward or away from the central lip member 94 to vary the width of the extrusion passageways 91 at selected intervals. Thus, as shown in FIG. 4, the central portions of the passageways 91 are adjusted to provide greater thickness in the extruded sheets at those parts of the die lips which are in line with the deepest parts of the mold halves, so as to afford greater initial thickness in selected continuous areas in the sheets to compensate for stretching during the forming operation. Similarly, any other areas which require greater thickness for strength or durability in the finished product may be provided for in this manner.

By extruding the sheets in this manner and controlling the thickness in selected areas during extrusion, such thickened areas provide continuous, two-dimensional, integrated reinforcing means which may be prepositioned to suit the needs of the ultimate container.

An alternate system embodying the essential features of this invention is illustrated in FIGS. 9A to 9D and is primarily intended for use in the manufacture of larger containers such as those of fifteen gallon size, for example. In this form of the invention, the operation is semi-continuous in that the sheets of plastic material extruded from the die 51 are intermittently ejected in an operation coordinated with the opening and closing of the molds 54. In other words, although the main extruder operates continuously, sheeting is ejected from the die lips intermittently under the action of a plastic accumulator generally indicated by the numeral 98.

This accumulator consists of a cylinder 99 into the bottom of which molten plastic from a main extruder is introduced through connection 100. A plunger 101 is designed to reciprocate vertically in the cylinder 99 in coordination with the opening and closing of the mold halves 54a and 54b which operate essentially the same as those previously described, with the exception that neither mold half is pivoted.

Thus, in the position shown in FIG. 9A, the cylinder 99 is accumulating plastic while the mold halves are in open position, after releasing a previously formed container 55a. While the mold halves are still in open position as shown in FIG. 9B, the plunger 101 is depressed in cylinder 99 to cause the ejection of the dual sheets 52 and 53 between the open mold halves, which then partially close as shown in FIG. 9C to points where their open faces engage the plastic sheets and vacuum form individual halves of containers on respective sheets. In FIG. 9D, the mold halves have completely closed to seal and partially sever the containers, during which time the plunger 101 has returned to its uppermost position in cylinder 99 to accumulate further plastic therein.

In this form of the invention, the mold halves are located considerably closer below the die 51 as the accumulation of plastic is accomplished in the accumulator 98. To facilitate sheet feeding in the forming operation, a pull down mechanism illustrated in detail in FIGS. 10 and 11 is employed. A hollow pull down bar 102 is mounted horizontally between two laterally spaced vertical air cylinders 103 and is vertically reciprocable by means of piston rods 104. End guide members 105, operating in conjunction with vertical tracks 106, stabilize the vertical movement of the pull down bar 102.

The pull down bar is interposed between the extruded sheets 52 and 53 as seen in FIG. 9A, and the periphery of the bar is provided with a series of openings 107, leading to the interior chamber of the pull down bar which is connected by line 108 to a source of vacuum. Thus, the periphery of the pull down bar under the action of vacuum is caused to adhere to the plastic sheets 52 and 53 which are pulled downwardly by the bar as it descends between the open mold halves 54, as shown in FIG. 9B.

The application of vacuum to the pull down bar and the vertical reciprocation thereof by cylinders 103, are coordinated with the opening and closing of the mold halves by any suitable means, not shown. Thus, in operation, when the mold halves reach fully open positions as shown in FIG. 9A, releasing the previously formed and sealed container 55a, the pull down bar has reached its uppermost position above the mold halves and immediately below the die 51. Just prior to closing movement of the mold halves, and coordinated with the functioning of the plastic accumulator 98, the pull down bar moves downwardly between the open mold halves in gripping engagement with the spaced sheets 52 and 53 in abutting relation to the previously formed container 55a, pushing the container downwardly and pulling with it the plastic sheets to present a new area to be formed. The pull down bar is then returned to its uppermost position as shown in FIG. 9C, during which movement the mold halves have partially closed into forming engagement with the plastic sheets. After the mold halves have formed individual container halves, the closing of the molds, as shown in FIG. 9D, seals the mold halves to form complete containers, after which the operation shown in FIG. 9A is repeated.

The pull down bar 102 is preferably cooled by water jacket 109 connected to the water system by tubes 110 which facilitates the gripping action of the bar, but prevents sticking of the sheeting thereto.

The formed containers still attached to the selvage may be conveyed by a take off mechanism, such as previously described, or deposited on a ramp (not shown) which supports the weight of the containers to be later removed manually from the selvage.

From the foregoing, it is believed that the invention may be readily understood by those skilled in the art without further description, it being borne in mind that numerous changes may be made in the details disclosed without departing from the spirit of the invention as set forth in the following claims.

I claim:

1. A method of manufacturing containers from plastic sheet material, comprising continuously extruding two transversely spaced sheets of thermoplastic material, advancing said spaced sheets between two opposed, horizontally separable mold halves while the latter are separated, intermittently and momentarily halting the advance of said sheets, subjecting said mold halves to vacuum while initiating their linear closure into parallel surface contact with respective adjacent sheets to separately but simultaneously vacuum mold the contacted areas of said sheets into completely preformed separate opposed container halves and then closing the mold halves to join and seal said sheets in a flat plane simultaneously along all boundaries of said mold halves to form closed containers from the previously formed portions thereof while still supported in respective sheets, suspending, under the influence of gravity, the portions of said sheets anterior to said mold halves during said momentary halting to permit gathering thereof, separating said mold halves to release said formed containers, resuming the advance of said sheets and the containers supported thereby, and subsequently removing said containers from said sheets.

2. A method of manufacturing plastic shipping and storage containers, comprising simultaneously extruding two continuous sheets of thermoplastic material in transversely spaced relation, vertically suspending said spaced sheets between two opposed, horizontally separable mold halves while the latter are separated, successively subjecting said mold halves to vacuum while initiating their linear closure into parallel surface contact with respective adjacent sheets to separately vacuum mold complete container halves on respective sheets, then completely closing said mold halves to join and seal said sheets in a flat plane simultaneously along all boundaries of said mold halves to form completely closed, sealed containers from the previously formed container halves while still supported in respective sheets, chilling the sealed containers to prevent future distortion thereof, retracting said mold halves to release said completed containers, and subsequently removing the latter from said sheets.

3. A method of manufacturing plastic shipping and storage containers, comprising continuously extruding two sheets of thermoplastic material in transversely spaced relation, simultaneously increasing the thickness of a selected area of at least one of said sheets in cross-section in at least one continuous, longitudinally extending path by controlling the thickness of the continuous extrusion of said thermoplastic material in said selected area to thereby provide a two-dimensional thickness distribution, vertically suspending said spaced sheets between two opposed, horizontally separable mold halves while the latter are separated, successively subjecting said mold halves to vacuum while initiating their linear closure into parallel surface contact with respective adjacent sheets to separately vacuum mold complete container halves on respective sheets, then completely closing said mold halves to join and seal said sheets in a flat plane simultaneously along all boundaries of said mold halves to form completely closed, sealed containers from the previously formed container halves while still supported in respective sheets, the heat of extrusion of the plastic being used for the forming and sealing operations, and conducting said complete containers to a point of removal from respective sheets.

4. The method as claimed in claim 2, including partially severing said containers from said joined sheets simultaneously with the joining thereof.

5. The method as claimed in claim 4, including conveying said joined sheets with formed containers attached to a point for removal of said container.

References Cited by the Examiner

UNITED STATES PATENTS

| | | | |
|---|---|---|---|
| 1,310,439 | 7/1919 | Roberts | 18—56 |
| 2,081,777 | 5/1937 | Talalay. | |
| 2,387,747 | 10/1945 | Cowley. | |
| 2,513,852 | 7/1950 | Donofrio. | |
| 2,522,956 | 9/1950 | Middleton | 18—19 |
| 2,579,399 | 12/1951 | Ruekberg | 18—19 |

(Other references on following page)

| | | UNITED STATES PATENTS | |
|---|---|---|---|
| 2,597,986 | 5/1952 | Halstead | 18—56 |
| 2,632,202 | 3/1953 | Haines | 18—5 |
| 2,696,640 | 12/1954 | Weinand | 18—12 |
| 2,720,679 | 10/1955 | Ratliff | 18—12 |
| 2,750,624 | 6/1956 | Coates et al. | 18—55 XR |
| 2,750,625 | 6/1956 | Colombo | 18—5 |
| 2,790,994 | 5/1957 | Cardot et al. | 18—55 XR |
| 2,810,934 | 10/1957 | Bailey | 18—55 |
| 2,918,698 | 12/1959 | Hagen et al. | 18—55 XR |

FOREIGN PATENTS

| | | |
|---|---|---|
| 882,497 | 3/1943 | France. |
| 1,029,586 | 3/1953 | France. |

ROBERT F. WHITE, *Primary Examiner.*

MICHAEL V. BRINDISI, ALEXANDER H. BRODMERKEL, *Examiners.*

M. R. DOWLING, *Assistant Examiner.*